United States Patent [19]

Kawamura

[11] 4,000,375
[45] Dec. 28, 1976

[54] AUTOMATIC CALL TRANSFER CIRCUIT FOR A PLURALITY OF TELEPHONES

[76] Inventor: Hachishiro Kawamura, 13-26, 2-chome, Oshima, Koto, Tokyo, Japan

[22] Filed: Feb. 20, 1975

[21] Appl. No.: 551,511

[52] U.S. Cl. .............................. 179/17 B; 179/38
[51] Int. Cl.² ........................................ H04M 1/00
[58] Field of Search ............. 179/17 B, 30, 19, 20, 179/38, 39, 27 E, 17 E, 16 H, 16 A, 16 AA, 86, 18 BH, 84 R, 84 B, 18 BD, 18 BE; 340/347 LP

[56] References Cited
UNITED STATES PATENTS

| | | | |
|---|---|---|---|
| 3,514,544 | 5/1970 | Chambers, Jr. | 179/17 B |
| 3,530,253 | 9/1970 | Bierman | 179/17 B |
| 3,651,274 | 3/1972 | Angner et al. | 179/38 |
| 3,725,595 | 4/1973 | Mechanic-Esfahani | 179/17 B |

Primary Examiner—Thomas A. Robinson
Attorney, Agent, or Firm—Oblon, Fisher, Spivak, McClelland & Maier

[57] ABSTRACT

An automatic call transfer circuit for a plurality of telephones which are connected in parallel respectively between a pair of telephone lines, relay coils each one of which is connected with a different one of the telephones respectively and condensers each one of which is connected in parallel with a different one of the relay coils respectively. Energizing of each one of the relay coils makes it possible to use only the telephone which is connected to the energized relay coil. The circuit further comprises a current holding circuit which has at least one Zener diode for holding a current between the telephone lines at a moment of call transfer between the telephones in a telephone conversation where the current is flowing in a prescribed single direction.

6 Claims, 6 Drawing Figures

AUTOMATIC CALL TRANSFER CIRCUIT FOR A PLURALITY OF TELEPHONES

BACKGROUND OF THE INVENTION

The present invention relates to an automatic call transfer circuit comprising a plurality of telephones which are connected in parallel respectively between a pair of telephone lines for a selective use thereof.

A call transfer switch for selective use of a pair of telephones is well known, which is suitable for a secret conversation. But, the call transfer switch is very bothersome in the operation thereof.

A branch system of a plurality of telephones is also used, which is not bothersome. But, the branch system of a plurality of telephones does not permit a secret conversation.

The inventor has made and tested various automatic call transfer circuits for a plurality of telephones. But, there are two problems. One of the problems is that a telephone conversation may be cut off at a time of call transfer between the telephones and becomes a finished condition. The other one of the problems is a large noise is heard by a receiver of a telephone which is engaged to one of the telephones of the device at a moment of call transfer between the telephones of the circuit.

SUMMARY OF THE INVENTION

Accordingly, it is an object of this invention to provide an automatic call transfer circuit comprising a plurality of telephones connected in parallel between a pair of telephone lines, which enables automatic call transfer without bother and also enables secret conversations by use of each one of the telephones.

Another object of the present invention is to provide an automatic call transfer circuit for a plurality of telephones, which is relatively trouble-free.

The foregoing objectives are achieved according to this invention through the provision of an automatic call transfer circuit comprising a plurality of telephones connected in parallel between a pair of telephone lines. The device circuit has relay coils each one of which is connected with a different one of the telephones respectively and condensers each one of which is connected in parallel with a different one of the relay coils repectively. Energizing of each one of the relay coils makes it possible to use only one of the telephones to which the energized relay coil is connected. The circuit comprises a current holding circuit including at least one Zener diode for holding a current between the telephone lines at a moment of call transfer between the telephones in a telephone conversation.

BRIEF DESCRIPTION OF THE DRAWINGS

Various other objects, features, and attendant advantages of the present invention will be more fully appreciated as the same becomes better understood from the following detailed description when considered in connection with the accompanying drawings wherein.

DESCRIPTION OF THE PREFERRED EMBODIMENTS

Figure 1:
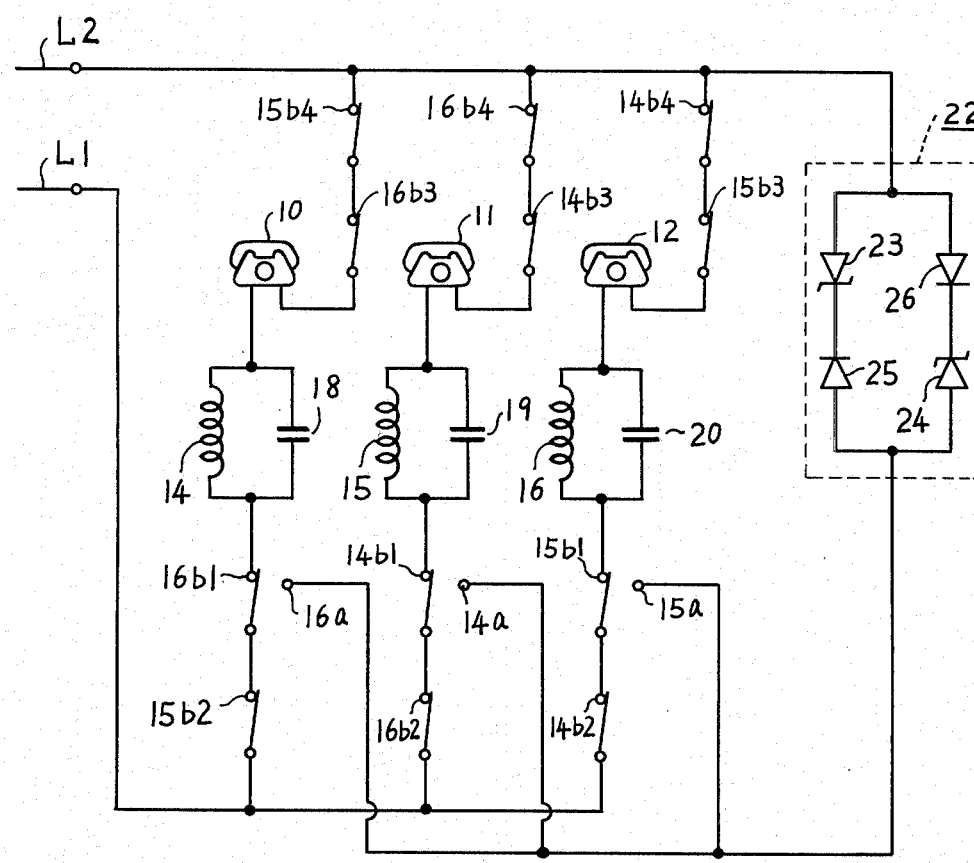
FIG. 1 is a diagram of a circuit of one embodiment of this invention.

In an embodiment of this invention shown in FIG. 1, telephones 10, 11 and 12 are connected in parallel between a pair of telephone lines L1 and L2. Relay coils 14, 15 and 16 are connected to the telephones 10, 11 and 12, respectively. Condensers 18, 19 and 20 are connected in parallel with the relay coils 14, 15 and 16, respectively, each one of which has a small capacity, for example 0.5 microfarad. It is possible that an alternating constituent of a current such as a calling signal or a voice signal can pass through each one of the condensers so as to avoid weakening by the relay coils.

When the relay coil 14 has been energized, normally closed contacts $14b1$, $14b2$, $14b3$ and $14b4$ are opened and normally opened contact $14a$ is closed. Similar contacts relating to the relay coils 15 and 16 are shown by similar reference characters.

A current holding circuit 22 is provided, which has a pair of Zener diodes 23 and 24 and a pair of diodes 25 and 26 connected as shown. The breakdown voltage of each one of the Zener diodes 23 and 24 is a little higher than the voltage between both terminals of the telephone in a used condition and less than the voltage between both terminals of the telephone in a non-used condition. For example, the voltage between both terminals of the telephone is 15 volts in a used condition and 48 volts in a non-used condition. Therefore, the breakdown voltage of the Zener diodes may be about 20 volts.

When the receiver of the telephone 10 is first taken off, a current flows from the telephone line L2 to the telephone line L1 through the telephone 10 and the relay coil 14. The relay coil 14 will be energized, then the other telephones 11 and 12 will be cut off from the telephone lines L1 and L2. If the telephone 10 is a dial type, dial pulses will be created by dialling of the telephone. The relay coil 14 will be repeatedly disenergized at time intervals of every one of the dial pulses, therefore contact $14a$ will be repeatedly opened and the current holding circuit 22 will be repeatedly cut off from the telephone line L1.

In a case of transfer of a telephone conversation following an outgoing call from the telephone 10 to the telephone 11 where a current flows from the telephone line L1 to the telephone line L2 the receiver of the telephone 10 should be hung up after the receiver of the telephone 11 has been taken off. When the receiver of the telephone 10 has been hung up, a current between the telephone lines L1 and L2 flows not through the telephone 10 but through the Zener diode 23 of the current holding circuit 22 by application of the breakdown voltage to the Zener diode 23. The relay coil 14 will be soon disenergized and the contacts $14b1$, $14b2$, $14b3$ and $14b4$ will be closed, and the contact $14a$ will be opened.

A calling signal from another telephone (not shown) rings all of the bells of the telephones 10, 11 and 12; therefore any one of the telephones 10, 11 and 12 can be used. A transfer between the telephones 10, 11 and 12 in a telephone conversation following an outgoing call where a current flows from the telephone line L2 to the telephone line L1 can be done by the same method as the transfer in a telephone conversation where a current flows from the telephone line L1 to the telephone line L2. In this case, the Zener diode 24 has applied to it the breakdown voltage because a current flows from the telephone line L2 to the telephone line L1.

Thus, the embodiment shown in FIG. 1 enables a continuous flow of a current at a moment of call transfer between the telephones without any trouble.

Figure 2A:
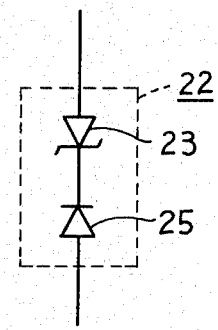
FIGS. 2A, 2B, 2C and 2D are diagrams illustrating modified current holding circuits, respectively.
Figure 2B:
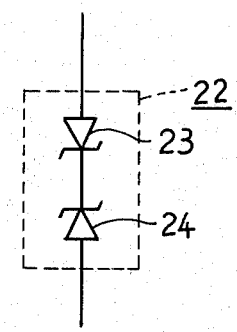
Figure 2C:
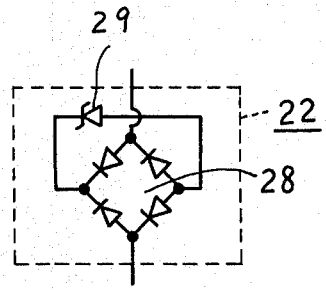
Figure 2D:
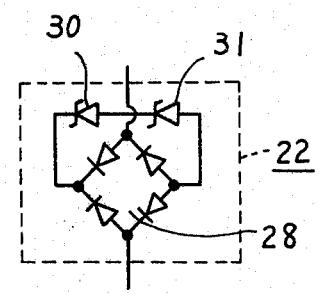

The current holding circuit 22 in the above described embodiment can be changed for various modified types shown in FIGS. 2A–2D. In FIG. 2A, the current holding circuit 22 has only the Zener diode 23 and the diode 25. Therefore, in a transfer of a telephone conversation where a current flows from the telephone line L2 to the telephone line L1, a current between the telephone lines L1 and L2 is cut off at a short duration of time. But, it does not usually make a finished condition of the conversation. In FIG. 2B, a current holding circuit 22 consists of a pair of Zener diodes 23 and 24 being connected in series and opposite directions to each other. In FIG. 2C, a current holding circuit 22 has a rectifying circuit 28 and only one Zener diode 29 to which is to be applied the breakdown voltage at transfer times of a telephone conversation where a current flows from the telephone line L1 to the telephone line L2 and a telephone conversation where a current flows from the telephone line L2 to the telephone line L1. In FIG. 2D, a pair of Zener diodes 30 and 31 which are serially connected are used instead of the Zener diode 29 in FIG. 2C to obtain a suitable total breakdown voltage.

Figure 3:
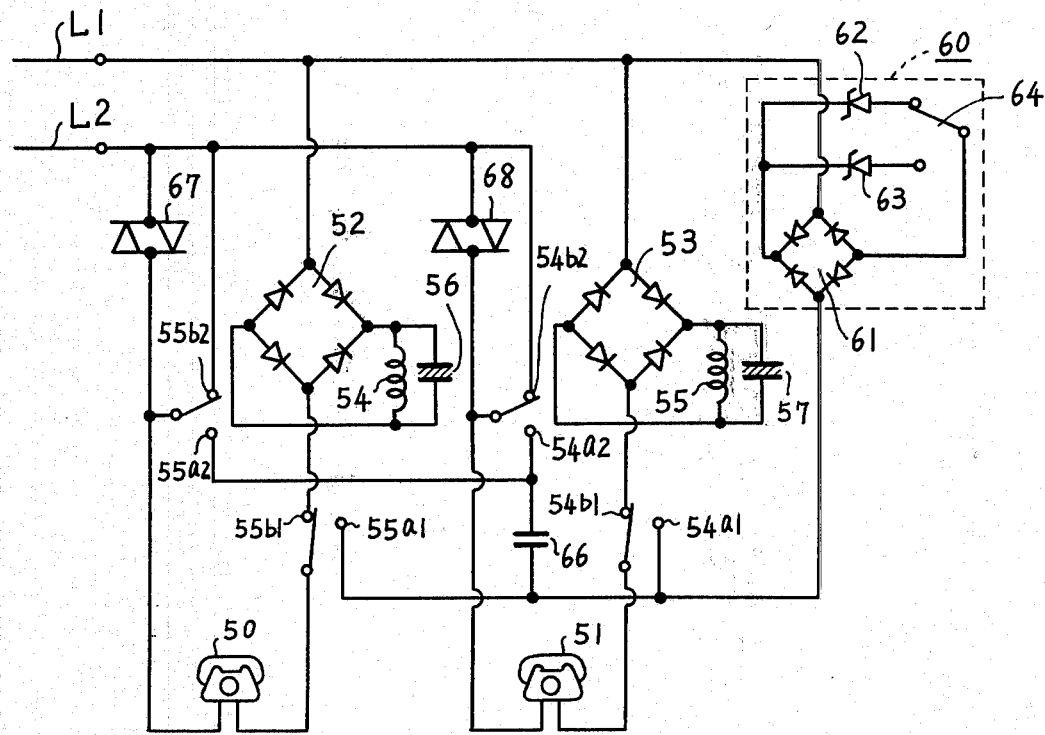
FIG. 3 is a diagram of a circuit of another embodiment of this invention.

In another embodiment of this invention shown in FIG. 3, a pair of telephones 50 and 51 are connected in parallel between a pair of telephone lines L1 and L2. Rectifying circuits 52 and 53 are inserted between each one of the telephones and the telephone line L1. Relay coils 54 and 55 and condensers 56 and 57 each one of which has a large capacity are connected as shown. The rectifying circuits 52 and 53 are effective to prevent the voltage of each of the condensers 56 and 57 from becoming zero in a telephone conversation after an outgoing call owing to inversion of the current's direction. thus, each of the relay coils 54 and 55 can maintain its energized condition in a telephone conversation after the outgoing call When the relay coil 54 has been energized, normally closed contacts 54$b$1 and 54$b$2 are opened and normally opened contacts 54$a$1 and 54$a$2 are to be closed. Similar contacts relating to the relay coil 55 are shown by similar reference characters.

A current holding circuit 60 has a rectifying circuit 61, Zener diodes 62 and 63 and a switch 64. The breakdown voltages of the Zener diodes 62 and 63 are 20 volts and 31 volts, respectively, for example. Therefore, the Zener diode 62 can be used where the maximum voltage between both terminals of the telephone is less than 20 volts in a condition of conversation. The other case, the Zener diode 63 will be used. The switch 64 is initially set for a selective use of the Zener diode 62 or 63.

A condenser 66 is provided which has a small capacity, for example 0.05 microfarad. 67 and 68 designate a pair of limiters each of which is composed of a pair of varistors connected in parallel and opposite directions each other. The resistance value of the limiter becomes large when a small current flows therethrough. The limiters 67 and 68 are connected in parallel with the contacts 55$b$2 and 54$b$2, respectively.

When the receiver of the telephone 50 has been first taken off for calling another telephone, the relay coil 54 is energized, then the telephone 51 is cut off in the direct connection between the telephone lines L1 and L2, and connected to the telephone line L1 through the current holding circuit 60 at one side and to the telephone line L2 through the limiter 68 at the other side. The condenser 66 is connected in parallel with the telephone 51. The relay coil 54 is not disenergized at time intervals of dial pulses created by the telephone 50, because the capacity of the condenser 56 is large.

In a case of a conversation using the telephone 50, when the receiver of the telephone 51 has been taken off, there is no current between the telephone 51 and the telephone line L1, and if there is any leakage current between the telephone 51 and the telephone line L2 the current will be weakened by the limiter 68. The condenser 66 is effective for absorbing the leakage current, a noise of radio broadcasting or the like which sometimes enters through the current holding circuit 60. Thus a secret conversation can take place.

A transfer between the telephones 50 and 51 in a conversation can be done by the same method as described about the embodiment shown in FIG. 1. A current flows between the telephone lines L1 and L2 through the current holding circuit 60, the telephone 51 and the limiter 68 at a moment of call transfer from the telephone 50 to the telephone 51, for example.

In this embodiment, various modifications will be made. For example, it is possible that only one limiter can be used so as to be selectively connected to the telephone 50 and 51 by using more contacts. It is very easy to make a similar circuit for three telephones. There is a case where the limiter 67 and 68 and the condenser 66 are not needed.

The circuits described above have a number of advantages, particularly in that each circuit enables automatic call transfers between a plurality of telephones without bothersome operations and troubles and also enables secret conversations using each one of the telephones.

The foregoing is of course considered as illustrative only of the principle of the invention. Obviously, numerous modifications and variations of the present invention are possible in light of the above teachings.

What is claimed as new and desired to be secured by Letters Patent of the United States is:

1. In a telephone system, an automatic call transfer circuit for a plurality of telephones comprising:
   first and second telephone lines;
   a plurality of telephone circuits normally connected in parallel across said first and second telephone lines, each of said telephone circuits including a telephone, a relay coil connected to each said telephone, said relay coil energizable by said telephone going off-hook, a condenser connected in parallel with each said relay coil, and means responsive to the energizing of said relay coil for disconnecting all other of said telephone circuits from parallel connection across said first and second telephone lines; and
   means for holding a current between said first and second telephone lines at a moment of call transfer from any one to another of said telephones in a conversation in which current flows through said first and second telephone lines, said current holding means including at least a first Zener diode.

2. The automatic call transfer circuit for a plurality of telephones recited in claim 1 wherein:
   said current holding means includes a rectifying circuit.

3. The automatic call transfer circuit for a plurality of telephones recited in claim 1 wherein:

said current holding means includes a second Zener diode.

4. The automatic call transfer circuit for a plurality of telephones recited in claim 1 including:
means responsive to one of said telephones going off-hook in one of said plurality of telephone circuits for connecting said current holding means in series with said first telephone line and all telephones in each of the other of said telephone circuits.

5. The automatic call transfer circuit for a plurality of telephones recited in claim 4 including:
a current limiter connected in series with said second telephone line and a telephone in one of said telephone circuits, wherein the resistance of said current limiter becomes a large value when a small current flows therethrough.

6. The automatic call transfer circuit for a plurality of telephones recited in claim 4 including:
a plurality of current limiters, each of said current limiters being connected in series with said second telephone line and a respective telephone in one of said plurality of telephone circuits, wherein the resistance of each of said current limiters becomes a large value when a small current flows therethrough; and
means for providing an alternate current path between said second telephone line and each of the respective telephones of said plurality of telephone circuits, said means including a normally closed contact in each of said plurality of telephone circuits, each said contact except one being opened when the receiver of the telephone is lifted up in a telephone circuit including said one contact.

* * * * *